(12) United States Patent
Noishiki et al.

(10) Patent No.: US 8,986,546 B2
(45) Date of Patent: Mar. 24, 2015

(54) FLOW CHANNEL STRUCTURE, AND MIXING METHOD, EXTRACTION METHOD, AND REACTION METHOD FOR FLUIDS

(75) Inventors: Koji Noishiki, Takasago (JP); Makoto Nishimura, Kobe (JP); Takeshi Yamashita, Kobe (JP); Daisuke Nishikawa, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 520 days.

(21) Appl. No.: 13/363,635

(22) Filed: Feb. 1, 2012

(65) Prior Publication Data

US 2012/0234755 A1 Sep. 20, 2012

(30) Foreign Application Priority Data

Mar. 18, 2011 (JP) .................................. 2011-060717

(51) Int. Cl.
*B01D 11/04* (2006.01)
*B01F 1/00* (2006.01)
(Continued)

(52) U.S. Cl.
CPC ............ *B01F 5/0478* (2013.01); *B01D 11/028* (2013.01); *B01F 5/0647* (2013.01);
(Continued)

(58) Field of Classification Search
CPC .. B01D 11/00; B01D 11/028; B01D 11/0496; B01F 5/0641–5/0647; B01F 5/0478; B01F 13/0059; B01F 13/0061; B01F 13/0064; B01F 1/00; B01F 1/005; B01F 1/0038; B01J 19/0093; B01J 2219/00781; B01J 2219/00851; B01J 2219/00855; B01J 2219/00783; B01J 2219/00894; B01J 2219/00873; B01J 2219/00889; B01J 19/24; B01J 19/248

USPC ................. 210/101, 511, 634; 137/814, 833; 422/502, 503, 505, 507, 527, 600–603; 204/450, 451, 600, 601; 366/181.5, 366/181.6, 336–338, 340, 341
See application file for complete search history.

(56) References Cited

U.S. PATENT DOCUMENTS 5,681,484 A * 10/1997 Zanzucchi et al. .............. 506/40
5,932,100 A * 8/1999 Yager et al. .................... 210/634
(Continued)

FOREIGN PATENT DOCUMENTS

EP 1 574 586 A2 9/2005
EP 1 574 586 A3 9/2005
(Continued)

OTHER PUBLICATIONS

U.S. Appl. No. 13/818,884, filed Feb. 25, 2013, Noishiki, et al.
(Continued)

*Primary Examiner* — Joseph Drodge
(74) *Attorney, Agent, or Firm* — Oblon, McClelland, Maier & Neustadt, L.L.P.

(57) ABSTRACT

To promote mixture of fluids on a plurality of stages, flow channels include a plurality of merging portions which penetrate from a top surface to a back surface of a substrate. An end of each of the sub channels is disposed so as to overlap the main channel at each of positions separated along the direction in which the main channel extends, and each of the merging portions communicates the main channels and the ends of the sub channels with each other, thereby changing a flow direction of the second fluid flowing through the sub channels to the thickness direction of the substrate, and merges the second fluid with the first fluid flowing through the main channels.

8 Claims, 8 Drawing Sheets

(51) Int. Cl.
  *B01F 5/00* (2006.01)
  *B01F 13/00* (2006.01)
  *B01J 19/24* (2006.01)
  *B01F 5/04* (2006.01)
  *B01D 11/02* (2006.01)
  *B01F 5/06* (2006.01)
  *B01F 13/10* (2006.01)
  *B01J 19/00* (2006.01)
  *B01F 15/02* (2006.01)

(52) U.S. Cl.
  CPC ......... *B01F13/0059* (2013.01); *B01F 13/1022* (2013.01); *B01F 15/0222* (2013.01); *B01J 19/0093* (2013.01); *B01J 2219/00783* (2013.01); *B01J 2219/00873* (2013.01); *B01J 2219/00889* (2013.01); *B01J 2219/00894* (2013.01)
  USPC ........ 210/634; 137/833; 210/511; 366/181.5; 366/341; 422/503; 422/603

(56) References Cited

U.S. PATENT DOCUMENTS

| | | | | |
|---|---|---|---|---|
| 6,136,272 | A * | 10/2000 | Weigl et al. | 422/82.05 |
| 6,454,945 | B1 * | 9/2002 | Weigl et al. | 210/634 |
| 6,454,954 | B1 * | 9/2002 | Brewster et al. | 216/7 |
| 6,482,064 | B1 * | 11/2002 | Lund | 446/175 |
| 6,825,047 | B1 * | 11/2004 | Woudenberg et al. | 436/518 |
| 7,837,946 | B2 * | 11/2010 | McBride et al. | 422/547 |
| 8,142,741 | B2 | 3/2012 | Yoshida et al. | |
| 2002/0092767 | A1 * | 7/2002 | Bjornson et al. | 204/451 |
| 2002/0187560 | A1 | 12/2002 | Pezzuto et al. | |
| 2003/0201022 | A1 | 10/2003 | Kawai et al. | |
| 2004/0200724 | A1 | 10/2004 | Fujii et al. | |
| 2004/0229349 | A1 * | 11/2004 | Daridon | 435/305.2 |
| 2004/0238052 | A1 * | 12/2004 | Karp et al. | 137/822 |
| 2004/0258571 | A1 | 12/2004 | Lee et al. | |
| 2005/0129580 | A1 * | 6/2005 | Swinehart et al. | 422/100 |
| 2005/0202489 | A1 | 9/2005 | Cho et al. | |
| 2006/0231136 | A1 | 10/2006 | Kawai et al. | |
| 2006/0262642 | A1 | 11/2006 | Park et al. | |
| 2007/0053808 | A1 | 3/2007 | Markowz et al. | |
| 2007/0171864 | A1 * | 7/2007 | Zhang et al. | 370/329 |
| 2008/0246172 | A1 | 10/2008 | Kawai et al. | |
| 2008/0277007 | A1 * | 11/2008 | Unger et al. | 137/833 |
| 2009/0269251 | A1 * | 10/2009 | Asano et al. | 422/130 |
| 2010/0015695 | A1 | 1/2010 | Cho et al. | |
| 2010/0021972 | A1 | 1/2010 | Cho et al. | |
| 2011/0266498 | A1 | 11/2011 | Noishiki et al. | |
| 2011/0268616 | A1 | 11/2011 | Noishiki et al. | |
| 2012/0095268 | A1 * | 4/2012 | Tonkovich et al. | 568/449 |
| 2012/0241013 | A1 * | 9/2012 | Linder et al. | 137/2 |

FOREIGN PATENT DOCUMENTS

| | | |
|---|---|---|
| EP | 1 724 007 A2 | 11/2006 |
| EP | 1 724 007 A3 | 11/2006 |
| EP | 2 384 810 A1 | 11/2011 |
| JP | 2004-108285 A | 4/2004 |
| JP | 2004-122107 A | 4/2004 |
| JP | 2006-75680 | 3/2006 |
| JP | 2006-75680 A | 3/2006 |
| JP | 2006-320897 A | 11/2006 |
| JP | 2008-168173 A | 7/2008 |
| JP | 2010-162427 A | 7/2010 |
| KR | 10-2006-0119154 | 11/2006 |
| WO | WO 03/015890 A1 | 2/2003 |
| WO | WO 2004/091771 A1 | 10/2004 |
| WO | WO 2010-082433 A1 | 7/2010 |

OTHER PUBLICATIONS

U.S. Appl. No. 12/482,903, filed Jun. 11, 2009, Ban, et al.
U.S. Appl. No. 13/296,810, filed Nov. 15, 2011, Noishiki, et al.
European Search Report issued on Apr. 9, 2013, in European Patent Application No. 12155296.2.

* cited by examiner

FIG.10

FLOW CHANNEL STRUCTURE, AND MIXING METHOD, EXTRACTION METHOD, AND REACTION METHOD FOR FLUIDS

BACKGROUND OF THE INVENTION

1. Field of the Invention

The present invention relates to a flow channel structure, and a mixing method, an extraction method, and a reaction method for fluids.

2. Description of the Related Art

Conventionally, flow channel structures have been known as means for causing a plurality of fluids to mix and bring about interaction between these fluids. Japanese Patent Application Laid-open No. 2006-75680 provides a flow channel structure for an extraction operation which merges two fluids, thereby extracting a subject from one fluid to the other fluid as an example of the flow channel structure.

The flow channel structure described in Japanese Patent Application Laid-open No. 2006-75680 has a flow channel for merging the two fluids while two fluids are flowing, and the flow channel is configured to merge the two fluids on a plurality of stages. Specifically, the flow channel structure is formed by horizontally piling and joining a top substrate having a first channel formed on a bottom surface and a bottom substrate having a second channel formed on a top surface. The first channel extends meanderingly on the bottom surface of the top substrate. The second channel includes a single inlet path formed on the top surface of the bottom substrate and a plurality of branch paths branching from the inlet path. Each of the branch paths vertically overlaps each of portions spaced apart along a direction in which the meandering first channel extends while the top substrate and the bottom substrate are vertically piled. Downward openings of portions which are out of the first channel, and do not overlap each of the branch paths of the second channel are sealed by the top surface of the bottom substrate, and upward openings of portions which are out of the second channel, and do not overlap the first channel are sealed by the bottom surface of the top substrate. A flow channel in which the first channel and corresponding branch paths of the second channel merge with each other at the respective portions spaced apart along the direction in which the first channel extends is formed in the flow channel structure in this way. A first fluid is caused to flow through the first channel, and a second fluid is caused to flow through the second channel. Both of the fluids merge with each other while forming an interface therebetween at each of the portions where the first channel and the branch path of the second channel overlap.

However, the first fluid flowing through the first channel and the second fluid flowing through the second channel only come in contact with each other via the interface at the portions where both of the fluids merge with each other in the above-mentioned conventional flow channel structure, and promotion of the mixture of both of the fluids is difficult, and mixture of different types of the second fluid on each of stages of mixture of the second fluid with the first fluid and individual control of flow quantities of the second fluid mixed with the first fluid on each of the mixture stages are difficult. Reasons for them are as mentioned below.

Both channels extend in parallel with each other at each of the portions where the first channel and each of the branch paths of the second channel overlap in the above-mentioned flow channel structure. As a result, the first fluid and the second fluid form the interface therebetween, and merge while flowing in parallel when both of them merge with each other at each of these portions of both of the channels. As a result, both of the fluids merge, but are not stirred, and flow downstream while maintaining the parallel state forming the interface therebetween, and the mixture of both of them is not promoted. Moreover, each of the branch paths branching from the single inlet path of the second channel overlaps and merges with each of the portions of the first channel in the above-mentioned flow channel structure, and the same type of the second fluid distributed via the inlet path of the second channel to each of the branch paths thus merges from each of the branch paths with the first fluid in the first channel. As a result, different types of second fluid from each of the branch paths cannot be merged and mixed with the first fluid in the first channel. Moreover, the flow quantity ratio of the second fluid distributed from the inlet path of the second channel to each of the branch paths is determined constant according to a channel shape thereof, and the flow quantity of the second fluid cannot be individually manipulated for each of the branch paths. As a result, the flow quantities of the second fluid to be mixed cannot be controlled at the respective stages where the first fluid in the first channel from the respective branch paths is mixed with the second fluid.

SUMMARY OF THE INVENTION

The present invention has been made in order to solve the above-mentioned problems, and has objects of promoting mixture of a first fluid and a second fluid while both of the fluids are being mixed on a plurality of stages, and enabling mixture of different types of the second fluid with the first fluid on the respective mixture stages and/or individual control of mixed flow quantities of the second fluid with the first fluid at the respective mixture stages in the flow channel structure.

In order to achieve the above-mentioned objects, a flow channel structure according to the present invention is a flow channel structure for causing a first fluid and a second fluid to flow so as to mix together, including a substrate in which a flow channel for causing the first fluid and the second fluid to flow is formed, where the flow channel is formed on a top surface of the substrate, and includes a main channel that causes the first fluid to flow along the top surface of the substrate, a plurality of sub channels that are formed on a back surface of the substrate facing the opposite direction to the top surface of the substrate, and causes the second fluid to flow along the back surface of the substrate, and a plurality of merging portions that penetrate the substrate in the thickness direction of the substrate from the top surface side to the back surface side, and merge the second fluid flowing through the plurality of sub channels with the first fluid flowing through the main channel, each of the sub channels of the flow channel has an inlet for introducing the second fluid into the sub channel, and the respective inlets are provided independently of one another, the inlet and an opposite end of each of the sub channels are arranged so as to overlap the main channel at respective positions spaced apart along a direction in which the main channel extends when viewed from a direction perpendicular to the top surface of the substrate, and each of the merging portions is formed at a position where the main channel and the end of each of the sub channels overlap in the substrate, communicates between the main channel and the end of the sub channel, thereby changing the flow direction of the second fluid flowing through the sub channel connected to the merging portion to the thickness direction of the substrate, and merges the second fluid with the first fluid flowing through the main channel.

In this flow channel structure, the main channel and the plurality of sub channels communicate with each other at the respective positions separated apart along the direction in which the main channel extends via the corresponding merging portions, and the second fluid can thus be merged with the first fluid flowing through the main channel at the respective positions separated apart along the flow direction of the first fluid. As a result, predetermined flow quantities of the second fluid can be merged and mixed with the first fluid respectively on the plurality of stages. Moreover, the second fluid changed in the flow direction to the thickness direction of the substrate by the merging portions can be merged with the first fluid flowing through the main channel along the top surface of the substrate in this flow channel structure. This merging form stirs both of the fluids, and can thus promote the mixture of both of the fluids, which is different from the case in which the both of the fluids are merged while they flow in parallel as in the conventional flow channel structure. Further, the inlets of the respective sub channels are provided independently of one another in this flow channel structure, different types of the second fluid can be respectively introduced into the sub channels via the respective inlets, or flow quantities of the second fluid introduced into the respective sub channels can individually be controlled. As a result, different types of the second fluid can be mixed with the first fluid on the respective mixture stages of the second fluid from the respective sub channels and the merging portions connected thereto with the first fluid flowing through the main channels, or mixed flow quantities of the second fluid with the first fluid can be individually controlled on the respective mixture stages.

In this case, the inlet of each of the sub channels may be disposed on a peripheral edge portion of the substrate.

This configuration promotes attachment of headers for individually supplying the inlets of the respective sub channels with the second fluid. As a result, the introduction of different types of the second fluid respectively into the sub channels, or the individual control of the flow quantities of the second fluid introduced into the respective sub channels are promoted.

In the above-mentioned flow channel structure, preferably, a plurality of the flow channels are formed on the substrate, the main channels of the respective flow channels are disposed in parallel on the top surface of the substrate, and the sub channels out of the plurality of sub channels of each of the flow channels located at the same position in sequence from an upstream side to a downstream side of the flow channel are disposed in parallel with each other on the back surface of the substrate.

The main channels of the respective flow channels are formed in parallel on the top surface side of the substrate, and corresponding sub channels out of the plurality of sub channels of the respective flow channels are provided in parallel on the back surface side of the substrate in this configuration, and the plurality of flow channels can be more densely provided in the surface direction of the substrate compared with a configuration in which the main channels and the sub channels of the respective flow channels are provided on one surface of the substrate. As a result, more flow channels can be internally provided for the flow channel structure of the same size. This configuration can thus reduce the size of the flow channel structure, and increase the processed quantity of the mixture of the first fluid and the second fluid for the same device size.

A mixing method for fluids according to the present invention is a mixing method for fluids of mixing a first fluid and a second fluid using the above-mentioned flow channel structure, where the first fluid is caused to flow through the main channel along the top surface of the substrate, and the second fluid is merged and mixed with the first fluid in the thickness direction of the substrate from each of the sub channels and the merging portion connected to each of the sub channels.

This mixing method for fluids can merge and mix predetermined flow quantities of the second fluid via the respective sub channels and the respective merging portions connected thereto with the first fluid flowing through the main channel respectively on the plurality of stages. According to such merging on a plurality of stages, an average flow quantity of the fluid flowing through the entire main channels decreases compared with a single-stage merging form in which an entire quantity of the second fluid is mixed at once with the first fluid flowing through the main channel. Therefore, this mixing method for fluids can reduce an average pressure loss in the main channel. Moreover, this mixing method for fluids can merge and mix the second fluid in the thickness direction of the substrate with the first fluid flowing through the main channel along the top surface of the substrate. As a result, the mixture between the first fluid and the second fluid can be promoted compared with a case in which the second fluid is merged in parallel with the first fluid. Further, according to this method, different types of the second fluid can be respectively introduced into the sub channels, or flow quantities of the second fluid introduced into the respective sub channels can individually be controlled via the inlets of the respective sub channels provided independently of one another in the flow channel structure. As a result, different types of the second fluid can be mixed with the first fluid on the respective mixture stages of the second fluid from the respective sub channels and the merging portions connected thereto with the first fluid flowing through the main channel, or mixed flow quantities of the second fluid with the first fluid can be individually controlled on the respective mixture stages.

An extraction method according to the present invention is an extraction method of mixing a fluid subject to extraction containing an extract and an extraction medium for extracting the extract from the fluid subject to extraction using the above-mentioned flow channel structure, thereby extracting the extract from the fluid subject to extraction into the extraction medium, where one fluid, which is one fluid out of the fluid subject to extraction and the extraction medium, is caused to flow through the main channel along the top surface of the substrate, and the other fluid, which is the other fluid out of the fluid subject to extraction and the extraction medium, from each of the sub channels and the merging portion connected to each of the sub channels is merged and mixed in the thickness direction of the substrate with the one fluid flowing through the main channel, and the extract is extracted from the fluid subject to extraction into the extraction medium within a mixed fluid of both of the fluids while the mixed fluid is flowing through the main channel toward a downstream side.

This extraction method can merge and mix the other fluid with the one fluid flowing through the main channel via each of the sub channels and the merging portion connected thereto on the plurality of stages. As a result, the average pressure loss in the main channel can be reduced similarly as in the mixing method. This extraction method can then carry out a multistage extraction operation in which the other fluid is mixed with the one fluid on the plurality of stages. This extraction operation can increase extraction efficiency compared with an extraction operation on a single stage. Specifically, the merging and mixing of the fluid subject to extraction with the extraction medium is carried out only once in the extraction operation on the single stage, an extraction speed thus decreases after renewal of a contact interface between both the fluids by the mixture is once stabilized, and the extraction progresses only slowly. In contrast, if the extraction operation is carried out on a plurality of stages as in this extraction method, the contact interface between the fluid subject to extraction and the extraction medium is renewed each time when both of the fluids merge with each other, and the extraction is promoted each time. As a result, overall extraction efficiency can be increased compared with the extraction operation on a single stage. Further, according this extraction method, the other fluid merges in the thickness direction of the substrate with the one fluid flowing through the main channel along the top surface of the substrate, both of the fluids are thus stirred upon the merging, the mixture between the fluid subject to extraction and the extraction medium is promoted, and the renewal of the contact interface between the fluid subject to extraction and the extraction medium is more actively carried out. The extraction efficiency can thus be increased. Further, according to this extraction method, different types of the other fluid can be mixed with the one fluid on the respective mixture stages of the other fluid from the sub channels and the merging portions connected thereto with the one fluid flowing through the main channel, or mixed flow quantities of the other fluid with the one fluid can be individually controlled on the respective mixture stages similarly as in the mixing method for fluids.

The one fluid may be the fluid subject to extraction, and the other fluid may be the extraction medium as a specific configuration of the extraction method.

Different types of the extraction medium may be used depending on the type of the fluid subject to extraction in a general extraction operation. Different types of extraction medium from the respective sub channels can be merged on the plurality of stages with the fluid subject to extraction flowing through the main channel according to this configuration, and the flow quantity and the like of the extraction medium supplied on each of the merging stages can be set considering the viscosity and the extraction capability of the extraction medium, thereby handling various types of extraction operation.

A reaction method according to the present invention is a reaction method for mixing a first reactant and a second reactant using the above-mentioned flow channel structure, thereby causing both of the reactants to chemically react with each other, where the first reactant is caused to flow through the main channel along the top surface of the substrate, the second reactant from each of the sub channels and the merging portion connected to each of the sub channels is merged and mixed in the thickness direction of the substrate with the first reactant flowing through the main channel, and both of the reactants chemically react with each other while the mixed fluid of both of the reactants is flowing through the main channel toward a downstream side.

This reaction method can merge and mix the second reactant with the first reactant flowing through the main channel via each of the sub channels and the merging portion connected thereto on the plurality of stages. As a result, the average pressure loss in the main channel can be reduced similarly as in the above mixing method. This reaction method then can carry out a chemical reaction in which the second reactant is mixed with the first reactant on the plurality of stages. This reaction method can increase reaction efficiency compared with a reaction method of merging and mixing at once an entire quantity of the second reactant with the first reactant. Specifically, if the entire quantity of the second reactant is merged and mixed at once with the first reactant, a contact interface between both of the reactants is renewed, and the reaction between both of the reactants is thus promoted. However, a reaction speed decreases once the renewal of the contact interface is stabilized. In contrast, the second reactant is mixed and merged with the first reactant on the plurality of stages as in this reaction method, the contact interface between the first reactant and the second reactant is renewed each time both of them merge with each other, and the reaction between both the reactants is promoted on each of the occasion. As a result, an overall reaction efficiency can be increased. Further, according to this reaction method, the second reactant merges in the thickness direction of the substrate with the first reactant flowing through the main channel along the top surface of the substrate, both of the reactants are thus stirred upon the merging, the mixture between both of the reactants is promoted, and the renewal of the contact interface between both of the reactants is more actively carried out. The reaction efficiency can thus be increased. Further, according to this reaction method, different types of the second reactant can be mixed with the first reactant on the respective mixture stages of the second reactants from the respective sub channels and the merging portions connected thereto with the first reactant flowing through the main channel, or mixed flow quantities of the second reactants with the first reactant can be individually controlled on the respective mixture stages similarly as the above mixing method for fluids.

As mentioned above, according to the present invention, the mixture of the first fluid and the second fluid is promoted while both of the fluids are being mixed on the plurality of stages, and the mixture of different types of the second fluid with the first fluid on the respective mixture stages and/or the individual control of mixed flow quantities of the second fluid with the first fluid at the respective mixture stages is enabled in the flow channel structure.

DESCRIPTION OF THE PREFERRED EMBODIMENTS

Hereinafter, an embodiment of the present invention will be explained while referring to the drawings.

First, the configuration of a flow channel structure and a flow channel device including the flow channel structure according to the embodiment of the present invention will be described while referring to FIGS. 1 to 9.

The flow channel device S according to this embodiment includes the flow channel structure 1 for causing a first fluid and a second fluid to flow so that they are mixed with each other, and a plurality of headers 102, 104, 106, 108, 110, 114.

Figure 1:
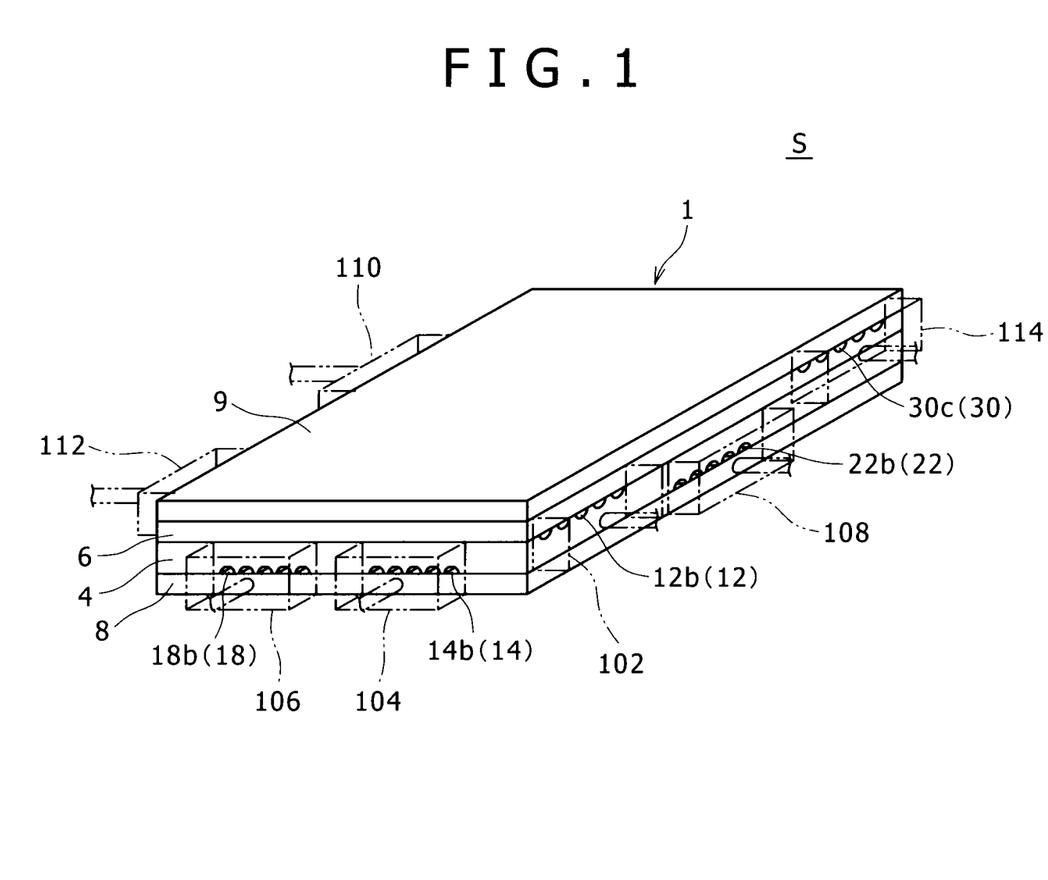
FIG. 1 is a perspective view showing a flow channel device including a flow channel structure according to an embodiment of the present invention.
Figure 2:
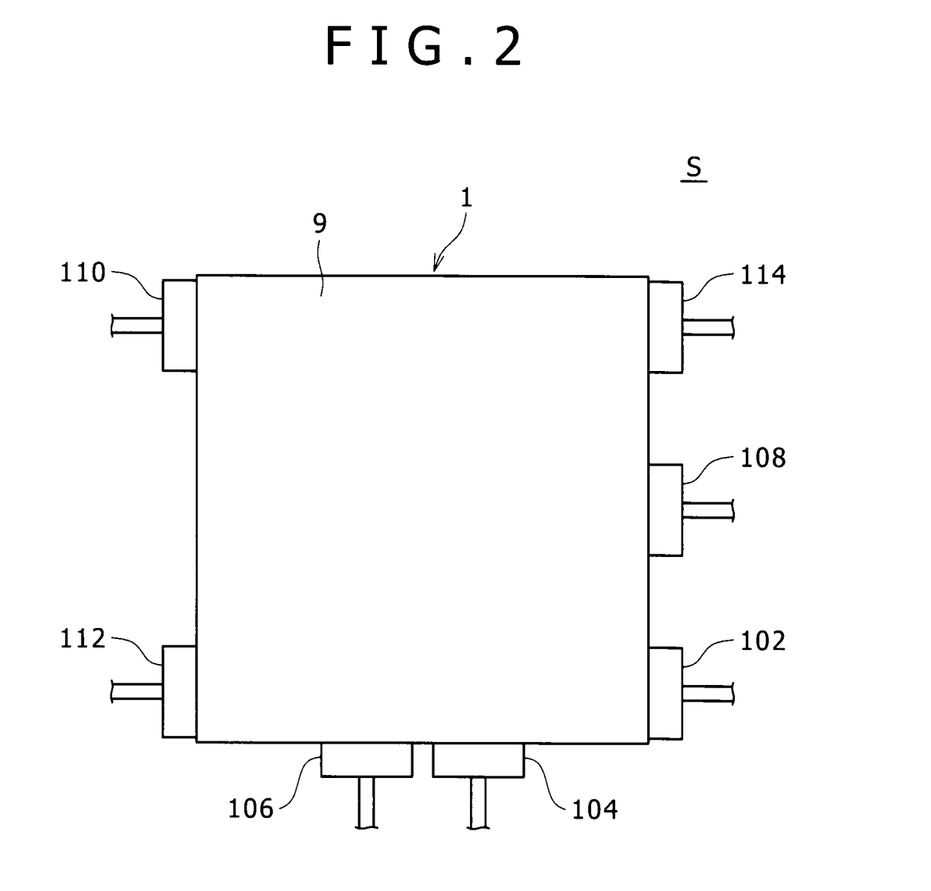
FIG. 2 is a plan view of the flow channel device shown in FIG. 1.
Figure 3:
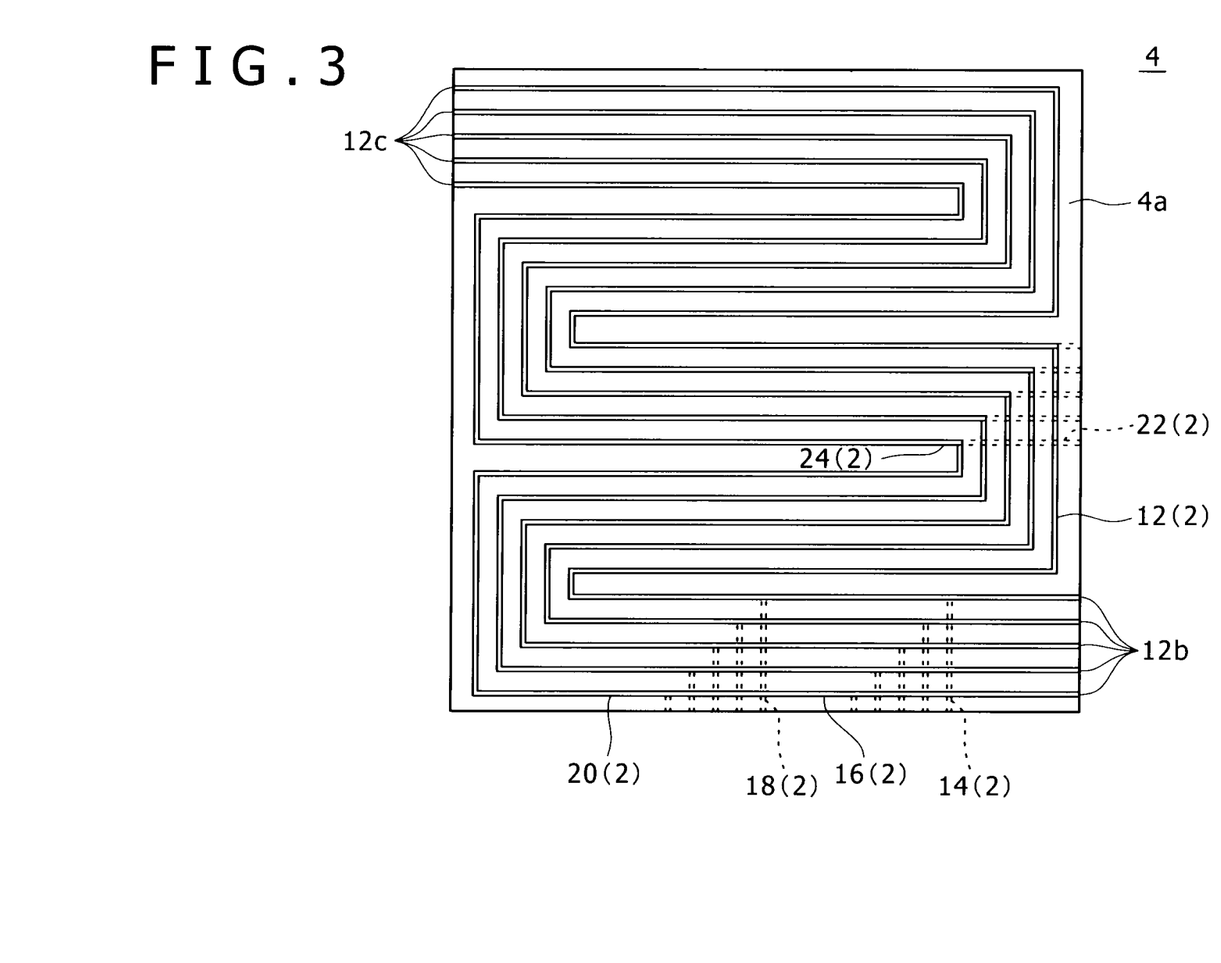
FIG. 3 is a view showing a top surface of a substrate constructing the flow channel structure.
Figure 4:
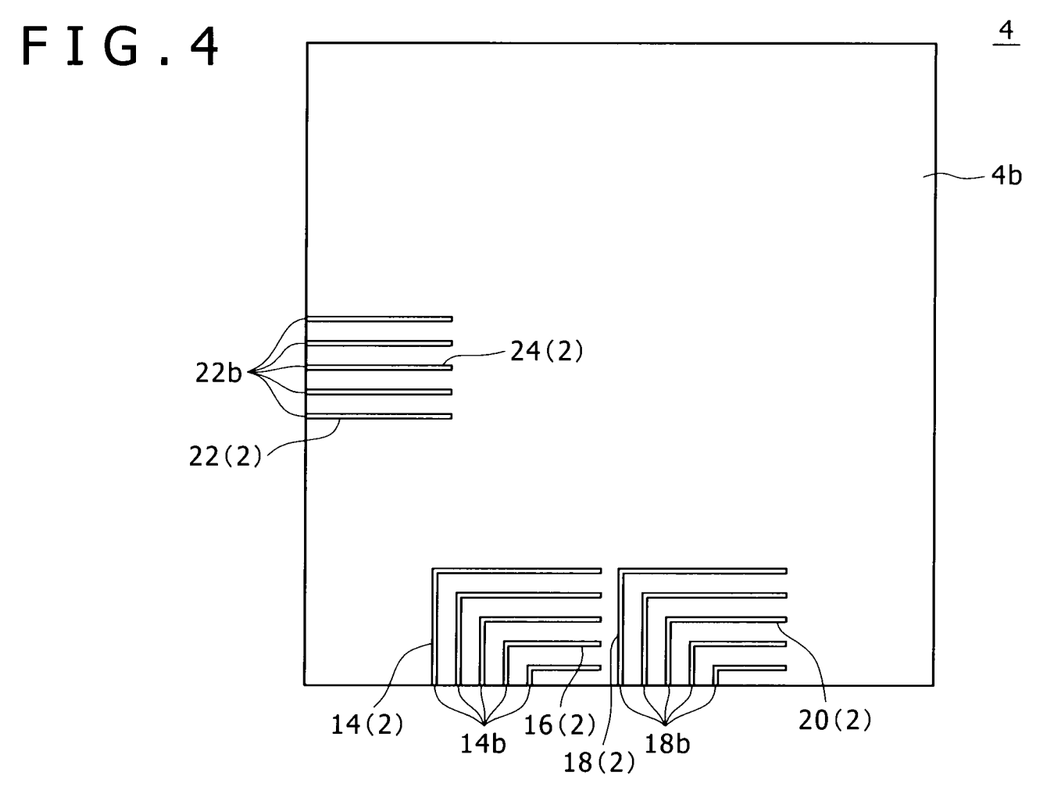
FIG. 4 is a view showing a back surface of the substrate shown in FIG. 3.
Figure 5:
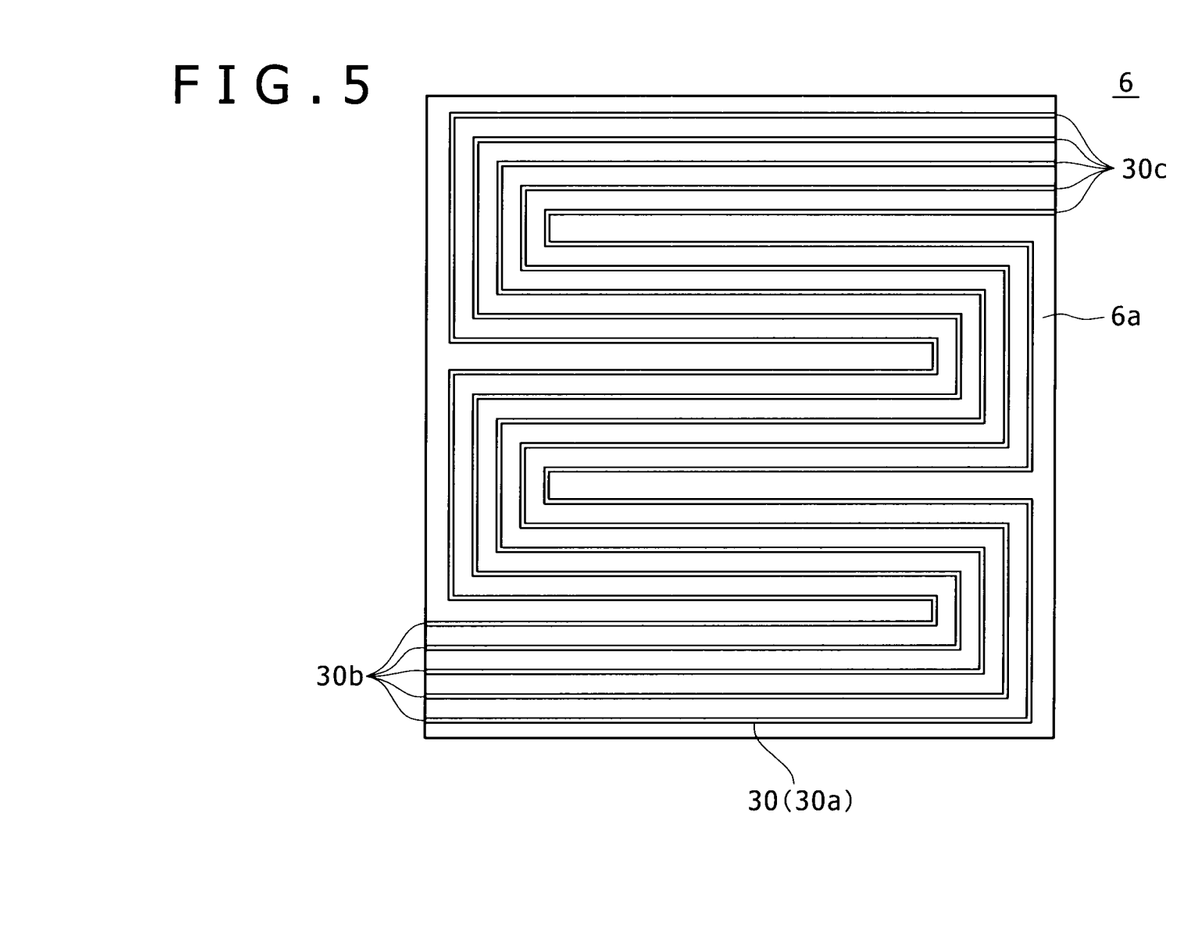
FIG. 5 is a diagram showing a top surface of a top-side sealing plate constructing the flow channel structure.
Figure 6:
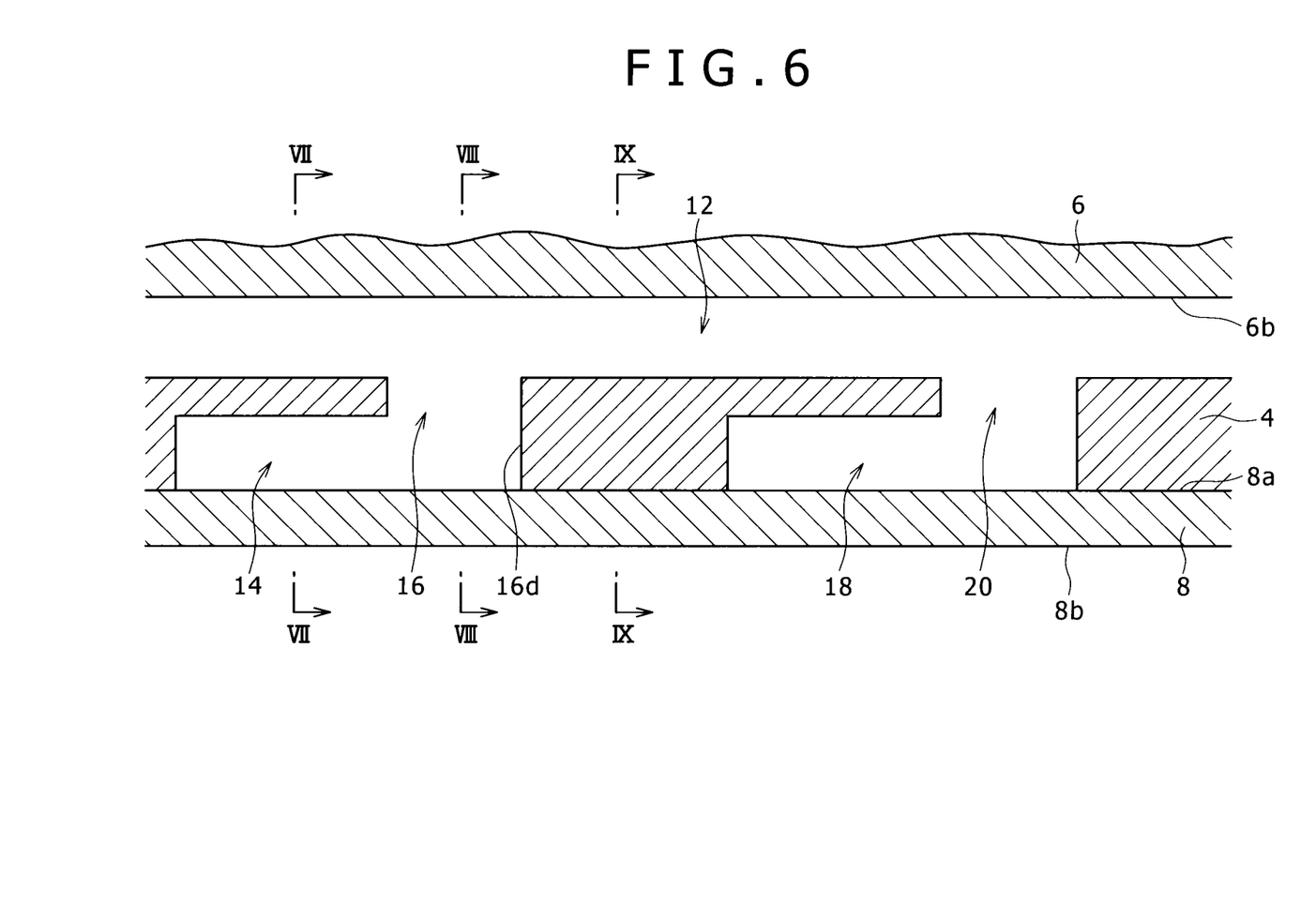
FIG. 6 is a cross sectional view along a main channel close to merging portions of a first sub channel and a second sub channel with the main channel of a predetermined flow channel in a layered structure including the top-side sealing plate, the substrate, and a back-side sealing plate constructing the flow channel structure.

The flow channel structure 1 includes inside a plurality of minute flow channels 2 (micro channels) for causing the first fluid and the second fluid to flow, and a plurality of heat medium channels 30 for causing a heat medium to flow. The flow channel structure 1 includes a substrate 4, a top-side sealing plate 6, a back-side sealing plate 8, and a heat-medium-channel sealing plate 9, as shown in FIG. 1. These plates 4, 6, 8, 9 are respectively formed by rectangular plates.

The plurality of flow channels 2 are formed on the substrate 4. Each of the flow channels 2 includes a main channel 12, a first sub channel 14, a first merging portion 16, a second sub channel 18, a second merging portion 20, a third sub channel 22, and a third merging portion 24.

Figure 7:
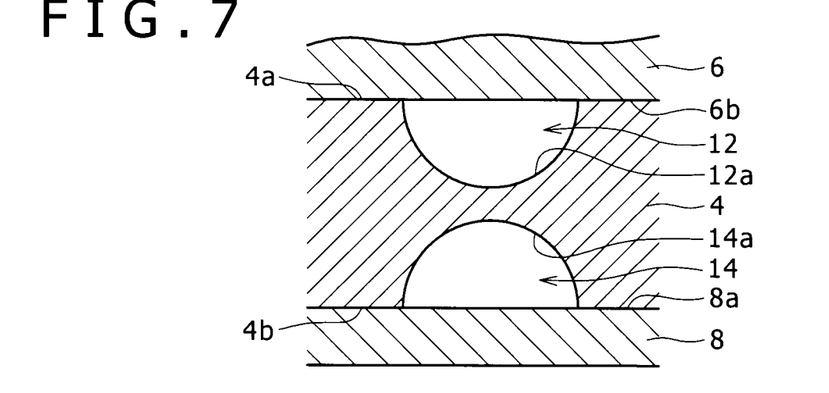
FIG. 7 is a cross-sectional view along a line VII-VII of the layered structure shown in FIG. 6.

The main channel 12 is used to cause the first fluid to flow along the top surface 4a (refer to FIG. 3) facing in one direction in the thickness direction of the substrate 4, and is formed on the top surface 4a of the substrate 4. In more detail, a plurality of main grooves 12a are formed by means of etching on the top surface 4a of the substrate 4, and the top-side sealing plate 6 is joined to the top surface 4a while the top-side sealing plate 6 is covering the top surface 4a of the substrate 4 so as to seal the opening on the top surface 4a side of each of the main grooves 12a. The main channel 12 is formed by the top-side sealing plate 6 sealing the opening on the top surface 4a side of the main groove 12a. Each of the main channels 12 extends meanderingly inside the surface 4a of the substrate 4. Moreover, the respective main channels 12 are arrange in parallel inside the surface 4a of the substrate 4. One end of each of the main channels 12 is provided on a predetermined edge of four edges constructing a peripheral edge portion of the rectangular substrate 4, and is arranged close to an end of the edge. This one end constitutes a first main channel inlet 12b for introducing the first fluid into the main channel 12. Each of the main channels 12 extends straight toward an opposite edge from the predetermined edge of the substrate 4 on which the one end of the main channel 12 is provided, then bends at 90 degrees, extends, then further bends at 90 degrees to extends toward the predetermined edge side, and further extends meanderingly while repeating such a bend. The other end of each of the main channels 12, which is an end on the opposite side with respect to the one end, is arranged close to an end on a farther side from the one end on the edge opposite to the predetermined edge of the substrate 4. The other end constitutes a first main channel outlet 12c for leading out the fluid from the main channel 12 A cross section of each of the first main channels 12 perpendicular to the extending direction thereof presents an approximately semicircular shape arranged to protrude toward the back surface 4b side of the substrate 4 as shown in FIG. 7.

The first sub channel 14 is used to cause the second fluid to flow along the back surface 4b facing the opposite direction with respect to the top surface 4a of the substrate 4 (refer to FIG. 4), and is formed on the back surface 4b of the substrate 4. In more detail, first sub grooves 14a as many as the main grooves 12a are formed by means of etching on the back surface 4b of the substrate 4, and the back-side sealing plate 8 is joined to the back surface 4b covering the back surface 4b of the substrate 4 so as to seal openings of the respective sub grooves 14a on the back surface 4b side. The first sub channels 14 are formed by the back-side sealing plate 8 sealing the openings of the first sub grooves 14a on the back surface 4b side. Each of the first sub channels 14 has one end on one edge out of the two edges perpendicular to each of the edges of the substrate 4 on which the ends of the main channels 12 are provided. This one end constitutes a first sub channel inlet 14b for introducing the second fluid into the first sub channel 14. This first sub channel inlet 14b is contained in a concept of an inlet of the present invention. Each of the first sub channels 14 extends straight and in perpendicular to the main channels 12 from the edge of the substrate 4 on which the first sub channel inlets 14b are provided toward the edge on the opposite side, bends at 90 degrees at a position on the back surface 4b side of the corresponding main channel 12, and extends along the main channel 12 to the downstream side. In other words, the other end (end on the opposite side of the first sub channel inlet 14b) of the each of the first sub channels 14 is arranged so as to overlap the corresponding main channel 12 viewed in the direction perpendicular to the top surface 4a of the substrate 4. A cross section of each of the first sub channels 14 perpendicular to the extending direction thereof presents an approximately semicircular shape arranged to protrude toward the top surface 4a side of the substrate 4 as shown in FIG. 7.

Figure 8:
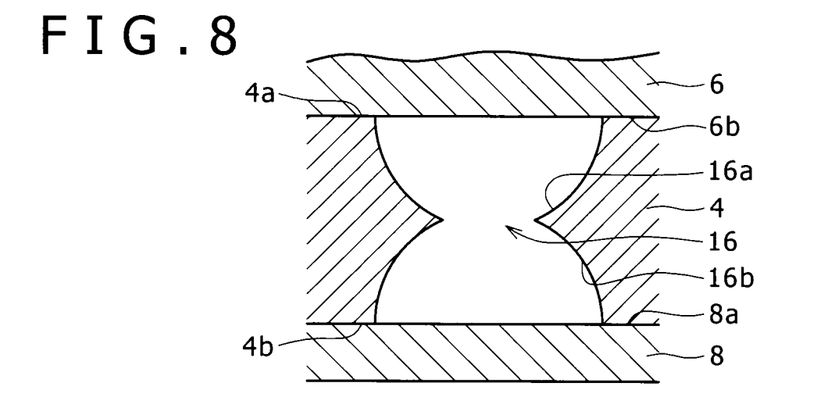
FIG. 8 is a cross-sectional view along a line VIII-VIII of the layered structure shown in FIG. 6.
Figure 9:
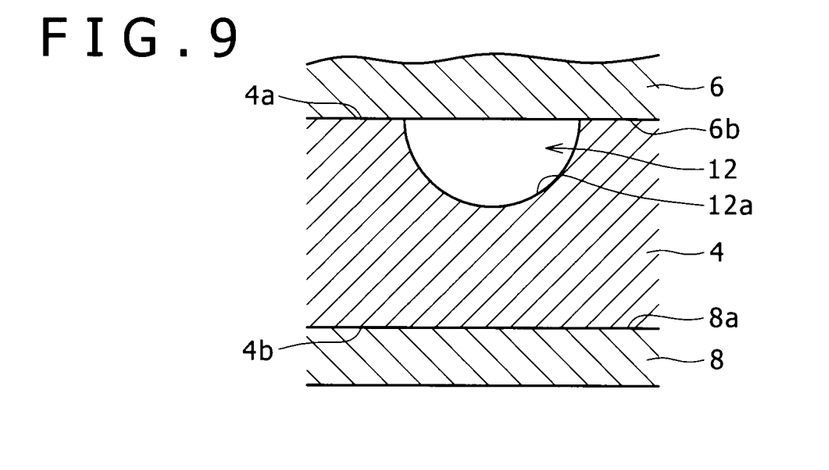
FIG. 9 is a cross-sectional view along a line IX-IX of the layered structure shown in FIG. 6.

The first merging portion 16 is used to merge the second fluid flowing through the first sub channel 14 with the first fluid flowing through the main channel 12, and is formed so as to penetrate the substrate 4 from the top surface side 4a to the back surface side 4b in the thickness direction. Specifically, each of the first merging portions 16 is formed at a position where each of the main channels 12 and the other end of each of the first sub channels 14 overlap in the substrate 4. The first merging portion 16 is formed by connecting a top portion of a first-merging-portion top-side groove 16a, which is formed on the top surface 4a of the substrate 4, and is in an approximately semicircular cross sectional shape, and a top portion of a first-merging-portion back-side groove 16b, which is formed on the back surface 4b of the substrate 4, and is in an approximately semicircular cross sectional shape, thereby penetrating the substrate 4 as illustrated in FIG. 8. The first-merging-portion top-side groove 16a is formed so as to overlap the main groove 12a and to coincide therewith at the center in the widthwise direction, and the first-merging-portion back-side groove 16b is formed so as to overlap the end on the downstream side of the first sub groove 14a, and to coincide therewith at the center in the widthwise direction. Moreover, the first merging portion 16 is located on the downstream side in the flow direction of the second fluid in the first sub channel 14, and includes a wall surface 16d arranged so as to oppose to the flow of the second fluid flowing from the first sub channel 14 into the first merging portion 16. This wall surface 16d extends in the thickness direction (direction perpendicular to the top surface 4a and the back surface 4b of the substrate 4) of the substrate 4. The second fluid which has flown from the first sub channel 14 into the first merging portion 16 hits on this wall surface 16d, and changes its flow direction so as to flow from the back surface 4b side to the top surface 4a side of the substrate 4.

The second sub channel 18 is used to cause the second fluid to flow along the back surface 4b of the substrate 4 similarly as the first sub channel 14. The second fluid to be caused to flow through the second sub channel 18 is not necessarily be the same type of the fluid as the second fluid flowing through the first sub channel 14, and may be a different type of fluid from the second fluid flowing through the first sub channel 14. The second sub channel 18 is formed at a position on the downstream side of the main channel 12 with respect to the first sub channel 14 in the back surface 4b of the substrate 4. Specifically, second sub grooves 18a as many as the main grooves 12a are formed on the back surface 4b of the substrate 4. The second sub channels 18 are formed by the back-side sealing plate 8 joined to the back surface 4b so as to seal the openings of the respective second sub grooves 18a on the back surface 4b side. Each of the second sub channels 18 has one end at a position opposite to the edge on which the main channel inlets 12b are provided with respect to the first sub channel inlets 14b on the edge, on which the first sub channels inlets 14b are provided, of the substrate 4. This one end constitutes a second sub channel inlet 18b for introducing the second fluid to the second sub channel 18. This second sub channel inlet 18b is contained in a concept of an inlet of the present invention. The other configurations of the second sub channels 18 are the same as the configurations of the first sub channels 14. The other end of each of the second sub channels 18 is arranged so as to overlap the main channel 12, when viewed in the direction perpendicular to the top surface 4a of the substrate 4, at a position spaced apart downstream along the main channels 12 from the position at which the main channels 12 overlap the other ends of the first sub channels 14.

The second merging portion 20 is used to merge the second fluid flowing through the second sub channel 18 with the first fluid flowing through the main channel 12, and is formed so as to penetrate the substrate 4 from the top surface 4a side to the back surface 4b side in the thickness direction of the substrate 4. The structure of the second merging portion 20 is the same as the structure of the first merging portion 16, and is formed at a position where each of the main channels 12 and the other end of each of the second sub channels 18 overlap in the substrate 4. In other words, each of the second merging portions 20 is arranged at a position separated apart downstream along the main channel 12 of the flow channel 2 from the first merging portion 16 of the flow channel 2 containing the second merging portion 20.

The third sub channel 22 is used to cause the second fluid to flow along the back surface 4b of the substrate 4 similarly as the sub channels 14, 18. The second fluid to be caused to flow through this third sub channel 22 may be the same as either one of the second fluids respectively flowing through the sub channels 14, 18, or different from both of the second fluids respectively flowing through the sub channels 14, 18. Third sub grooves 22a as many as the main grooves 12a are formed on the back surface 4b of the substrate 4, and the third sub channels 22 are formed by the backside sealing plate 8 joined to the back surface 4b so as to seal the openings of the respective third sub grooves 22a on the back surface 4b side. Each of the third sub channels 22 has one end close to the center of the same edge, on which the main channel inlets 12b are provided, of the substrate 4. This one end constitutes a third sub channel inlet 22b for introducing the second fluid to the third sub channel 22. This third sub channel inlet 22b is contained in a concept of an inlet of the present invention. The third sub channel inlets 22b, the first sub channel inlets 14b, and the second sub channel inlets 18b are provided independently of one another. Each of the third sub channels 22 extends straight from the edge, on which the third sub channel inlets 22b are provided, of the substrate 4, toward the opposite edge. Each of the third sub channels 22 is arranged on the back side surface 4b side of the corresponding main channel 12. In other words, each of the third sub channels 22 extends along a portion out of the corresponding main channel 12, and located on the top surface 4a side of the third sub channel 22 in the same direction thereof. The other configurations of the third sub channels 22 are the same as the configurations of the first sub channels 14. The other end of each of the third sub channel 22 is arranged so as to overlap the main channel 12, when viewed in the direction perpendicular to the top surface 4a of the substrate 4, at a position spaced apart downstream along the main channels 12 from the position at which the main channels 12 overlap the other ends of the second sub channels 18.

The third merging portion 24 is used to merge the second fluid flowing through the third sub channel 22 with the first fluid flowing through the main channel 12, and is formed so as to penetrate the substrate 4 from the top surface 4a side to the back surface 4b side in the thickness direction of the substrate 4. The structure of the third merging portion 24 is the same as the structure of the first merging portion 16 and the second merging portion 20, and is formed at a position where each of the main channels 12 and the other end of each of the third sub channels 22 overlap in the substrate 4. In other words, each of the third merging portions 24 is arranged at a position separated apart downstream along the main channel 12 of the flow channel 2 from the second merging portion 20 of the flow channel 2 containing the third merging portion 24.

The top-side sealing plate 6 is a flat panel including the top surface 6a facing one direction in the thickness direction thereof (refer to FIG. 5), and the back surface 6b facing the opposite direction to the top surface 6a thereof. The back surface 6b of the top-side sealing plate 6 is joined to the top surface 4a of the substrate 4. The plurality of heat medium channels 30 for causing the heat medium to flow are formed on the top surface 6a of the top surface side sealing plate 6. In more detail, a plurality of heat medium grooves 30a are formed by means of etching on the top surface 6a of the top-side sealing plate 6, and the heat-medium-channel sealing plate 9 is joined to the top surface 6a of the top-side sealing plate 6 so as to seal an opening of the top surface 6a side of each of the heat medium grooves 30a. The heat medium channel 30 is formed by the heat-medium-channel sealing plate 9 sealing the opening of the top surface 6a side of the heat medium groove 30a. The heat medium channels 30 are provided as many as the flow channels 2. Each of the heat medium channels 30 extends meanderingly in the top surface 6a of the top-side sealing plate 6 in a horizontally reversed shape of each of the main channels 12. One end of each of the heat medium channels 30 is provided on one edge of the four edges constructing a peripheral edge portion of the top-side sealing plate 6 in a rectangular shape, and is arranged at a position on the opposite side of the main channel inlets 12b while the top-side sealing plate 6 is joined to the top surface 4a of the substrate 4. The one end constitutes a heat medium inlet 30b for introducing the heat medium into the heat medium channel 30. Moreover, the other end of each of the heat medium channels 30 is provided on an edge on the opposite side of the edge on which the other ends of the heat medium channels 30 are provided on the top-side sealing plate 6, and is arranged at a position on the opposite side of the main channel inlets 12c while the top-side sealing plate 6 is joined to the top surface 4a of the substrate 4. The other end constitutes a heat medium outlet 30c for discharging the heat medium from the heat medium channel 30. Each of portions extending straight from the edge, on which the heat medium inlets 30b of the respective heat medium channels 30 are provided, of the top-side sealing plate 6 toward the edge on the opposite side is arranged so as to overlap each of corresponding portions of the main channels 12, and to extend in the same direction while the top-side sealing plate 6 is joined to the top surface 4a of the substrate 4. Heat exchange is carried out between the heat medium flowing through each of the heat medium channels 30 and the fluid flowing through the main channels 12 by the heat medium, thereby heating the fluid flowing through the main channels 12.

The back-side sealing plate 8 is a flat panel including the top surface 8a facing one direction in the thickness direction thereof, and the back surface 8b facing the opposite direction to the top surface 8a thereof. The top surface 8a of the back-side sealing plate 8 is joined to the back surface 4b of the substrate 4.

A main supply header 102 is used to supply each of the main channels 12 with the first fluid. The main supply header 102 is attached on an end surface on which the main channel inlets 12b of the flow channel structure 1 are provided so as to be connected to all the main channel inlets 12b. The first fluid is supplied from a fluid supply device, which is not shown, to the main supply header 102, and the main supply header 102 distributes the supplied first fluid to each of the main channel inlets 12b for introduction of each of predetermined flow quantities.

The first sub supply header 104 is used to supply each of the first sub channels 14 with the second fluid. The first sub supply header 104 is attached on an end surface on which the first sub channel inlets 14b of the flow channel structure 1 are provided so as to be connected to all the first sub channel inlets 14b. The second fluid is supplied from a fluid supply device, which is not shown, to the first sub supply header 104, and the first sub supply header 104 distributes the supplied second fluid to each of the first sub channel inlets 14b for introduction of each of predetermined flow quantities.

The second sub supply header 106 is used to supply each of the second sub channels 18 with the second fluid. The second sub supply header 106 is attached on an end surface on which the second sub channel inlets 18b of the flow channel structure 1 are provided so as to be connected to all the second sub channel inlets 18b. The other configurations of the second sub supply header 106 are the same as the configurations of the first sub supply header 104.

The third sub supply header 108 is used to supply each of the third sub channels 22 with the second fluid. The third sub supply header 108 is attached on an end surface on which the third sub channel inlets 22b of the flow channel structure 1 are provided so as to be connected to all the third sub channel inlets 22b. The other configurations of the third sub supply header 108 are the same as the configurations of the first sub supply header 104.

A fluid collection header 110 is used to collect the fluid discharged from the main channel outlet 12c of each of the main channels 12. The fluid collection header 110 is attached on an end surface on which the main channel outlets 14c of the flow channel structure 1 are provided so as to be connected to all the main channel outlets 14c. The fluid collection header 110 is connected to a reservoir, which is not shown, or a downstream device, which is not shown, and the fluid collected by the collection header 110 is fed to the reservoir or the downstream device.

A heat medium supply header 112 is used to supply each of the heat medium channels 30 with the heat medium. The heat medium supply header 112 is attached on an end surface on which the heat medium channel inlets 30b of the flow channel structure 1 are provided so as to be connected to all the heat medium inlets 30b. The heated heat medium is supplied from a heat medium supply device, which is not shown, to the heat medium supply header 112, and the heat medium supply header 112 distributes the supplied heat medium to each of the heat medium inlets 30b for introduction of each of predetermined flow quantities.

A heat medium collection header 114 is used to collect the heat medium discharged from the heat medium outlet 30c of each of the heat medium channels 30. The heat medium collection header 114 is attached on an end surface on which the heat medium outlets 30c of the flow channel structure 1 are provided so as to be connected to all the heat medium outlets 30c. The heat medium collection header 114 is connected to the heat medium supply device, which is not shown, and the heat medium collected by the heat medium collection header 114 is returned to the heat medium supply device.

As described before, in the flow channel structure 1 according to this embodiment, the main channels 12 and the respective sub channels 14, 18, 22 communicate with each other at the respective positions separated apart along the direction in which the main channels 12 extend via the corresponding merging portions 16, 20, 24 in the flow channels 2, and the second fluid can be merged with the first fluid flowing through the main channels 12 at the respective positions separated apart along the flow direction thereof. As a result, the second fluid can be merged and mixed with the first fluid on the plurality of stages.

Moreover, the second fluid can be merged in the thickness direction of the substrate 4 by each of the merging portions 16, 20, 24 with the first fluid flowing through the main channels 12 along the top surface 4a of the substrate 4 according to this embodiment. This merging form stirs both of the fluids upon the merging of both of the fluids, and can thus promote the mixture of both of the fluids, which is different from the case in which the both of the fluids are merged while they flow in parallel as in the conventional flow channel structure.

Moreover, the first sub channel inlets 14b, the second sub channel inlets 18b, and the third sub channel inlets 22b are provided independently of one another according to this embodiment, different types of the second fluid can be introduced to each of the sub channels 14, 18, 22 via each of the sub channel inlets 14b, 18b, 22b, or different quantities of the second fluid can be introduced to each of the sub channels 14, 18, 22. As a result, different types of the second fluid from each of the sub channels 14, 18, 22 and the merging portions 16, 20, 24 connected thereto can be merged and mixed with the first fluid flowing through the main channels 12, or the flow quantities of the second fluid, which are from the each of the sub channels 14, 18, 22 and the merging portions 16, 20, 24 connected thereto, and are merged and mixed with the first fluid in the main channels 12, can be individually controlled.

Moreover, the flow channel structure 1 according to this embodiment can be used for various chemical operation methods (such as mixture, extraction, and reaction), a flowing state after the merging of the fluids can be controlled by changing the flow rates of the fluids to be caused to flow respectively through the main channels 12 and each of the sub channels 14, 18, 22 and shapes of openings of each of the merging portions 16, 20, 24 according to kind of an intended chemical operation method. Specifically, if a two-phase flow is generated after the merging, the flow state of the two-phase flow can be controlled, and if a slug flow is generated after the merging, the slug interval of the slug flow can be controlled. The area of the contact interface between the fluids can be controlled by the control of the flow state of the fluids after the merging.

Moreover, the main channel inlets 12b and the respective sub channel inlets 14b, 18b, 22b are arranged on the peripheral edge portion of the substrate 4 according to the present embodiment, the main supply header 102 can thus be easily connected to the main channel inlets 12b, and the supply headers 104, 106, 108 can respectively be easily connected to the corresponding sub channel inlets 14b, 18b, 22b.

Moreover, the main channels 12 of the respective flow channels 2 are arranged in parallel on the top surface 4a of the substrate 4 according to this embodiment. Moreover, the first sub channels 14 of the respective flow channels 2 are arranged in parallel with each other, the second sub channels 18 of the respective flow channels 2 are arranged in parallel with each other, and the third sub channels 22 of the respective flow channels 2 are arranged in parallel with each other on the back surface 4b of the substrate 4. As a result, the plurality of flow channels 2 can be more densely provided in the direction parallel with the top surface 4a and the back surface 4b of the substrate 4 compared with a configuration in which both the main channels and the sub channels of the respective flow channels are provided on one surface of the substrate. As a result, more flow channels 2 can be internally provided for the flow channel structure 1 of the same size. The processed quantity by mixing the first fluid and the second fluid can be increased by a large number of flow channels 2 while the increase in the size of the flow channel structure 1 is restrained according to this embodiment.

First Example

A description will now be given of an extraction method employing the flow channel structure 1 as a first example of the present invention.

A fluid subject to extraction containing an extract is introduced into the main channels 12 of the flow channel structure 1 in this extraction method. The fluid subject to extraction is a liquid. The fluid subject to extraction introduced into the main channels 12 flows downstream through the main channels 12.

On the other hand, an extraction medium, which is a fluid for extracting the extract from the fluid subject to extraction, is introduced to each of the sub channels 14, 18, 22 of the flow channel structure 1. The same type of extraction medium is introduced into each of the sub channels 14, 18, 22 on this occasion. Quantities of 30% of the required quantity of the extraction medium required for extracting the entire extract from the fluid subject to extraction are respectively introduced into the first sub channels 14 and the second sub channels 18, and a quantity of 40% of the required quantity is introduced into the third sub channels 22.

The extraction medium introduced from the first sub channel inlets 14b into the sub channels 14 flows toward the main channel 12 side, then flows downstream along the main channels 12, and flows into the first merging portions 16. The extraction medium, which has flown into the first merging portions 16, changes its flow direction to the thickness direction of the substrate 4 (direction from the back surface 4b side to the top surface 4a side of the substrate 4), and merges in the direction with the fluid subject to extraction flowing through the main channels 12. In other words, the extraction medium merges with the fluid subject to extraction in the direction perpendicular to the flow direction of the fluid subject to extraction. As a result, the extraction medium is mixed with the fluid subject to extraction so as to stir the fluid subject to extraction, and a contact interface between the extraction medium and the fluid subject to extraction is actively renewed. The mixed fluid of the fluid subject to extraction and the extraction medium flows downward in the main channels 12, and the extract in the fluid subject to extraction is extracted into the extraction medium via the contact interface between the fluid subject to extraction and the extraction medium in the course thereof.

The extraction medium introduced into the second sub channels 18 from the second sub channel inlets 18b merges with the mixed fluid of the fluid subject to extraction and the extraction medium flowing through the main channels 12 while flowing from the second sub channels 18 via the second merging portions 20. The flowing form of the extraction medium in the second sub channels 18 and the merging form of the extraction medium with the mixed fluid via the second merging portions 20 are the same as the flowing form of the extraction medium in the first sub channels 14 and the merging form of the extraction medium with the fluid subject to extraction via the first merging portions 16. As a result of this merging, the fluid subject to extraction and the extraction medium are mixed, and the contact interface between the extraction medium and the fluid subject to extraction is actively renewed similarly as the merging at the first merging portions 16. The mixed fluid of the fluid subject to extraction and the extraction medium further flows downward through the main channels 12, and the extract in the fluid subject to extraction is further extracted into the extraction medium via the contact interface between the fluid subject to extraction and the extraction medium in the course thereof.

The extraction medium introduced into the third sub channels 22 from the third sub channel inlets 22b merges with the mixed fluid of the fluid subject to extraction and the extraction medium flowing through the main channels 12 while flowing from the third sub channels 22 via the third merging portions 24. The extraction medium flows downward straight through the third sub channels 22, and merges via the third merging portions 24 with the mixed fluid of the fluid subject to extraction and the extraction medium flowing through the main channel 12 as the same merging form as the extraction medium A merges with the fluid subject to extraction via the first merging portions 16 on this occasion. As a result, the fluid subject to extraction and the extraction medium are mixed, and the contact interface between the extraction medium and the fluid subject to extraction is actively renewed as in the above-described respective forms of merging. The mixed fluid of the fluid subject to extraction and the extraction medium further flows downward through the main channels 12, and the extract in the fluid subject to extraction is further extracted into the extraction medium via the contact interface between the fluid subject to extraction and the extraction medium in the course thereof.

Finally, the fluid which has reached a target extraction ratio is discharged and collected from each of the main channel outlets 12d.

As described above, according to this extraction method, this extraction medium can be merged and mixed with the fluid subject to extraction flowing through the main channels 12 via the respective sub channels 14, 18, 22 and the respective merging portions 16, 20, 24 connected thereto on the plurality of stages, and the extraction operation can thus be carried out on the plurality of stages. This extraction operation can increase extraction efficiency compared with an extraction operation on a single stage.

Figure 10:
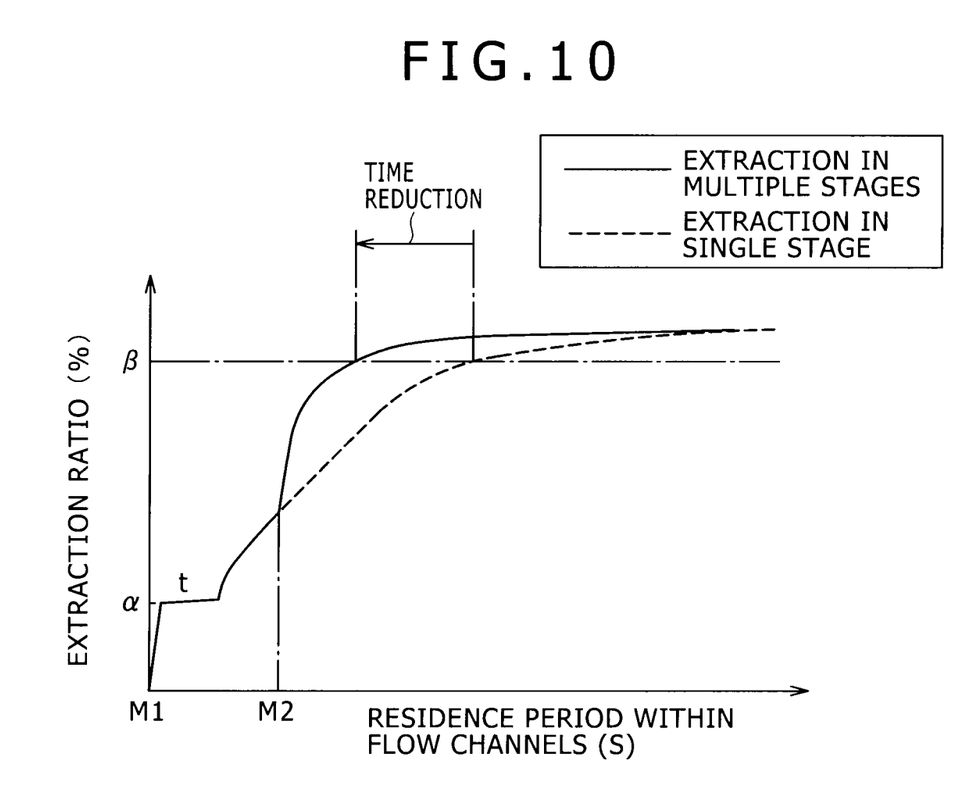
FIG. 10 is an image describing an effect of increasing an extraction efficiency of an extraction method employing the flow channel structure according to the embodiment of the present invention.

Specifically, as shown in FIG. 10, in an extraction operation on a single stage (refer to a broken line in FIG. 10), when the merging and mixing of the extraction medium with the fluid subject to extraction is carried out at a time point M1 in the chart, though the extraction ratio rapidly increases to $\alpha(\%)$ as a result of the renewal of the contact interface between both of the fluids caused by the mixture, the extraction speed decreases as the extraction progresses after a stable period $t(s)$ of the mixed state has elapsed, and the extraction speed becomes very low after the target extraction ratio $\beta(\%)$ is exceeded. The extraction speed after the stable period $t(s)$ is lower than the extraction speed when the extraction ratio increases to $\alpha(\%)$ as a result of the mixture. It is considered that this is caused by the mixed state between both of the fluids being stabilized, and the renewal of the contact interface between both the fluids being stagnated.

On the other hand, the extraction operation (refer to a solid line in FIG. 10) on a plurality of stages, the extraction medium is merged and mixed with the fluid subject to extraction at the time point M1, the extraction ratio rapidly increases to α(%), the stable period t(s) elapses, and, after the extraction slightly progresses, the merging and mixing with the extraction medium are again carried out at a time point M2 in the chart. As a result, the renewal of the contact interface between the fluid subject to extraction and the extraction medium is activated again, and the extraction is thus promoted, resulting in a rapid increase of the extraction ratio. As a result, the extraction ratio reaches the target extraction ratio β(%) in a short period compared with the extraction operation on the single stage. Therefore, the extraction method according to this example enables the decrease in the period of the extraction operation based on this principle, resulting in an increase in overall extraction efficiency.

Further, according to this extraction method, the extraction medium merges in the thickness direction of the substrate 4 with the fluid subject to extraction flowing through the main channels 12 along the top surface 4a of the substrate 4, the fluids are stirred upon the merging, the mixture between the fluid subject to extraction and the extraction medium is promoted, and the renewal of the contact interface between the fluid subject to extraction and the extraction medium is more actively carried out. The extraction efficiency can thus be increased.

Moreover, this extraction method can reduce the average flow quantity of the fluid flowing through the main channels 12 compared with the case in which the entire quantity of the extraction fluid is merged at once with the fluid subject to extraction flowing through the main channels as a result of the configuration that the predetermined flow quantities of the extraction medium are merged and mixed via the respective sub channels 14, 18, 22 and the respective merging portions 16, 20, 24 connected thereto with the fluid subject to extraction flowing through the main channels 12 respectively on the plurality of stages. Therefore, an average pressure loss can be reduced in the main channels 12.

Second Example

A description will now be given of a reaction method employing the flow channel structure 1 as a second example of the present invention.

This reaction method introduces a first reactant to the main channels 12 of the flow channel structure 1 from the main channel inlets 12b thereof. The first reactant introduced into the main channels 12 flows downstream through the main channels 12.

On the other hand, a second reactant is introduced respectively into the sub channels 14, 18, 22 of the flow channel structure 1 in order for a chemical reaction with the first reactant. Different types of second reactant may be introduced respectively into the sub channels 14, 18, 22 on this occasion. Moreover, predetermined quantities of the same type of second reactant may be distributed and introduced into the sub channels 14, 18, 22 respectively. Moreover, predetermined flow quantities of the same type of second reactant may be distributed to and introduced into two sub channels out of the sub channels 14, 18, 22 respectively, and a different type of second reactant may be introduced into the remaining sub channel.

It should be noted that the first reactant introduced into the main channels 12 and the second reactant introduced into the respective sub channels 14, 18, 22 may be entirely liquids or gasses. Moreover, some of the first reactant introduced into the main channels 12 and the second reactant introduced into the respective sub channels 14, 18, 22 may be liquids, and the rest of them may be gasses.

The second reactant introduced into the first sub channels 14 merges and mixes with the first reactant flowing through the main channels 12 via the first merging portions 16. On this occasion, the flowing form of the second reactant in the first sub channels 14 and the merging form of the second reactant with the first reactant via the first merging portions 16 are the same as the flowing form of the extraction medium A and the merging form with the fluid subject to extraction via the first merging portions 16 in the extraction method according to the first example. The second reactant which has merged with the first reactant flowing from the first merging portions 16 to the main channels 12 is mixed with the first reactant so as to be stirred, and a contact interface between both of the reactants is actively renewed. The mixed fluid of both of the reactants flows downstream through the main channels 12, and both of the reactants chemically react with each other in the course thereof.

The second reactant introduced into the second sub channels 18 merges via the second merging portions 20 with the mixed fluid of the first reactant flowing through the main channels 12 and the second reactant merging from the first merging portions 16. The flowing form and the merging form of the second reactant on this occasion are the same as the flowing form and the merging from of the second reactant in the first sub channels 14 and the first merging portions 16. As a result of merging of the second reactant from the second merging portions 20 with the mixed fluid flowing through the main channels 12, the second reactant is mixed with the mixed fluid flowing through the main channels 12 so as to be stirred, and the contact interface between the first reactant and the second reactant is actively renewed again. The mixed fluid of these reactants flows downstream through the main channels 12, and the first reactant and the second reactant chemically react with each other in the course thereof.

The second reactant introduced into the third sub channels 22 then merges and mixes with the mixed fluid flowing through the main channels 12 via the third merging portions 24. The flowing form and the merging form of the second reactant via the third sub channels 22 and the third merging portions 24 on this occasion are the same as the flowing form and the merging form of the extraction medium C via the third sub channels 22 and the third merging portions 24 in the extraction method according to the first example. As a result of merging of the second reactant from the third merging portions 24 with the mixed fluid flowing through the main channels 12, the second reactant is mixed with the mixed fluid flowing through the main channels 12 so as to be stirred, and the contact interface between the first reactant and the second reactant is actively renewed further. The mixed fluid of these reactants flows downstream through the main channels 12, and the first reactant and the second reactant chemically react with each other in the course thereof.

Finally, the fluid containing a reaction product is discharged and collected from the respective main channel outlets 12d, and the reaction product is extracted from the fluid.

As described above, in this reaction method, the predetermined flow quantities of the second reactant can be merged and mixed via the respective sub channels 14, 18, 22 and the respective merging portions 16, 20, 24 connected thereto with the first reactant flowing through the main channels 12 respectively on the plurality of stages. As a result, the contact interface between the first reactant and the second reactant is renewed each time when the second reactant merges from each of the merging portions 16, 20, 24 to the main channels 12, and the chemical reaction between both of the reactants is promoted each time. As a result, an overall reaction efficiency can be increased.

Further, according to this reaction method, the second reactant merges in the thickness direction of the substrate 4 with the first reactant flowing through the main channels 12 along the top surface 4*a* of the substrate 4, both of the reactants are thus stirred upon the merging, the mixture between both of the reactants is promoted, and the renewal of the contact interface between both of the reactants is more actively carried out. The reaction efficiency can thus be increased.

Moreover, this reaction method can introduce different types of second reactants via the respective sub channel inlets 14*b*, 18*b*, 22*b* of the flow channels 2 independent of one another into the respective sub channels 14, 18, 22. In this case, the different types of reactant from the respective sub channels 14, 18, 22, and the merging portions 16, 20, 24 connected thereto can be mixed with the first reactant flowing through the main channels 12. As a result, a plurality of different chemical reactions can be generated stepwise. It should be noted that the respective flow quantities of the second reactant, which are from the respective sub channels 14, 18, 22, and the merging portions 16, 20, 24 connected thereto, and are mixed with the first reactant flowing through the main channels 12, can also be individually controlled.

Moreover, similarly as the extraction method of the first example, this reaction method can reduce the average pressure loss in the main channels 12 as a result of the configuration that the predetermined flow quantities of the second reactant are merged via the respective sub channels 14, 18, 22 and the respective merging portions 16, 20, 24 connected thereto with the first reactant caused to flow through the main channels 12 respectively on the plurality of stages.

It should be noted that the embodiment presently disclosed should be considered as an illustrative example in all respects, and not to be limiting. The scope of the present invention is not defined by the aforementioned explanation of the embodiment, but rather by the scope of the appended claims. Equivalence of the claims and all changes that fall within the claims are embraced by the claims.

For example, the flow channel structure 1 may be used only for mixing the first fluid and the second fluid. According to this mixing method for fluids, first fluid is introduced into the respective main channels 12, and the second fluid is introduced into the respective sub channels 14, 18, 22. The second fluid introduced into the respective sub channels 14, 18, 22 merges with the first fluid flowing through the main channels 12 in the same merging form as the merging form of the extraction medium with the fluid to be extracted according to the extraction method of the first example, and the both fluids are mixed.

In this mixing method for fluids, the predetermined flow quantities of the second fluid can be merged and mixed via the respective sub channels 14, 18, 22 and the respective merging portions 16, 20, 24 connected thereto with the first fluid flowing through the main channels 12 respectively on the plurality of stages. An average flow quantity through the entire main channels 12 is reduced compared with a mixing method in which an entire quantity of the second fluid is merged at once with the first fluid flowing through the main channels. Therefore, an average pressure loss can be reduced in the main channels 12. Moreover, this mixing method for fluids merges the respective second fluids with the first fluid flowing through the main channels 12 along the top surface 4*a* of the substrate 4 in the thickness direction of the substrate 4, and the second fluid can thus be merged with the first fluid in the direction perpendicular to the flow direction of the first fluid. As a result, the mixture between the first fluid and the second fluid can be promoted upon the merging of both of the fluids compared with a case in which the second fluid is merged in parallel with the first fluid. Moreover, this mixing method for fluids can respectively introduce different types of second fluid via the respective sub channel inlets 14*b*, 18*b*, 22*b* independent of one another into the respective sub channels 14, 18, 22 of the flow channels 2, and can individually control the flow quantities of the second fluid introduced into the respective sub channels. As a result, different types of the second fluid can be mixed with the first fluid on the respective mixture stages of the second fluid from the respective sub channels 14, 18, 22 and the merging portions 16, 20, 24 connected thereto with the first fluid flowing through the main channels 12, or mixed flow quantities of the second fluids with the first fluid can be individually controlled on the respective mixture stages.

This mixing methods of fluids can be used for emulsification for obtaining an emulsion by mixing a fluid of a dispersoid as the second fluid with a fluid of a dispersion medium as the first fluid, for example, and the like.

Different types of second fluid may be respectively introduced into the sub channels 14, 18, 22, or predetermined quantities of the same type of second fluid may be distributed to and introduced into the sub channels 14, 18, 22 respectively in the mixing method for fluids.

Moreover, the shape of the main channels 12 in the top surface 4*a* of the substrate 4 and the shape of the sub channels 14, 18, 22 in the back surface 4*b* of the substrate 4 may vary from the shapes described above.

Moreover, the number of the sub channels belonging to the flow channels is not limited to three. The flow channel may have two, four, or more sub channels.

Moreover, the positions at which the respective sub channels merge via the merging portions with the main channels are not limited to the positions shown in the above-described embodiment, and the merging positions may be positions different from those described above.

Moreover, the cross sectional shapes of the main channels, the respective sub channels, and the respective merging portions may vary from those described above.

Moreover, the flow channel structure may not include the heat medium channels. In other words, the heat-medium-channel sealing plate 9 may be omitted, and a plate in which the heat medium channels 30 are not formed, in place of the top-side sealing plate 6, may be joined to the top surface 4*a* of the substrate 4 in the flow channel structure 1.

Moreover, a plurality of the flow channel structures 1 may be piled in the flow channel device. This configuration can increase the processing efficiencies of the extraction, the chemical reaction, and the mixture of fluids.

Moreover, the number of flow channels provided in the flow channel structure is not limited to the number shown in the embodiment. Specifically, channels less (such one) than the flow channels shown in the embodiment or flow channels more than the flow channels shown in the embodiment may be provided in the flow channel structure.

Moreover, the main channel inlets, the main channel outlets, and the inlets of the respective sub channels may not be provided on the periphery of the substrate. For example, these inlets and outlets may be provided within the surface of the substrate. In this case, through holes connected to the inlets of the flow channels may be formed on the substrate, and through holes communicating with these through holes may be formed in the sealing plate, and the fluids corresponding to the inlets may be introduced through the through holes on the top surface side or the back surface side of the sealing plate. Moreover, similarly, through holes connected to the main channel outlets of the respective main channels may be formed in the substrate, through holes communicating with these through holes may be formed in the sealing plate, and the fluid may be collected through the through holes on the top surface side or the bottom surface side of the sealing plate.

Moreover, in the extraction method, different types of extraction medium via the respective sub channel inlets 14*b*, 18*b*, 22*b*, which are independent of one another, of the flow channels 2 may be introduced into the respective sub channels 14, 18, 22. In this case, the different types of extraction medium from the respective sub channels 14, 18, 22, and the merging portions 16, 20, 24 connected thereto can be mixed with the fluid subject to extraction flowing through the main channels 12, thereby carrying out the extraction. This extraction method can be used for a case in which the fluid subject to extraction contains a plurality of different types of extract, for example. Specifically, by causing extraction media respectively suitable for the plurality of types of extracts contained in the fluid subject to extraction to individually flow through the respective sub channels 14, 18, 22, and merging the respective extraction media from the respective merging portions 16, 20, 24 with the fluid subject to extraction flowing through the main channels 12, the extracts corresponding to the respective extraction media can be extracted. It should be noted that the respective flow quantities of the extraction media merged from the respective sub channels 14, 18, 22, and the merging portions 16, 20, 24 connected thereto with the fluid subject to extraction flowing through the main channels 12 can also be individually controlled.

Moreover, the extraction medium may be caused to flow through the main channels 12, and predetermined flow quantities of the fluid subject to extraction may be caused to flow respectively through the sub channels 14, 18, 22 in the extraction method.

Moreover, the number of types of extracts contained in the fluid subject to extraction is not limited to one in the extraction method. In other words, a plurality of types of extracts may be contained in the fluid subject to extraction.

What is claimed is:

1. A flow channel structure for causing a first fluid and a second fluid to flow so as to mix together, comprising a substrate in which a flow channel for causing the first fluid and the second fluid to flow is formed, wherein:
    the flow channel includes a main channel formed on a top surface of said substrate and that permits the first fluid to flow along the top surface of said substrate, a plurality of sub channels formed on a back surface of said substrate facing opposite the top surface of said substrate and that permit the second fluid to flow along the back surface of said substrate, and a plurality of merging portions that penetrate said substrate in the thickness direction of said substrate from the top surface side to the back surface side, and permit merger of the second fluid flowing through the plurality of sub channels with the first fluid flowing through the main channel;
    each of the sub channels has an inlet for introducing the second fluid into the sub channel and an opposite end provided opposite the inlet, wherein an overlap portion of each of the sub channels between the inlet and the opposite end overlaps the main channel and extends in parallel with the main channel when viewed from a direction perpendicular to the top surface of said substrate, and wherein the merging portion coincides with the overlap portion; and
    the opposite end of each of the sub channels coincides with the merging portion and includes a wall surface opposing the flow of the second fluid flowing from the first sub channel into the merging portion, such that the second fluid is caused by the wall surface to flow in the thickness direction of said substrate toward the top surface of the substrate.

2. The flow channel structure according to claim 1, wherein the inlet of each of the sub channels is disposed on a peripheral edge portion of said substrate.

3. The flow channel structure according to claim 1 or 2, wherein:
    a plurality of the flow channels are formed on said substrate;
    the main channels of the respective flow channels are disposed in parallel on the top surface of said substrate; and
    the sub channels are disposed in parallel with each other on the back surface of said substrate.

4. A mixing method for fluids of mixing a first fluid and a second fluid using the flow channel structure according to claim 1 or 2, wherein the first fluid is caused to flow through the main channel along the top surface of the substrate, and the second fluid is merged and mixed with the first fluid in the thickness direction of the substrate.

5. An extraction method of mixing a fluid subject to extraction containing an extract and an extraction medium for extracting the extract from the fluid subject to extraction using the flow channel structure according to claim 1 or 2, thereby extracting the extract from the fluid subject to extraction into the extraction medium, wherein:
    one of said fluids is caused to flow through the main channel along the top surface of the substrate, and the other of said fluids are merged and mixed in the thickness direction of the substrate; and
    the extract is extracted while the mixed fluid is flowing through the main channel toward a downstream side.

6. The extraction method according to claim 5, wherein:
    the one fluid is the fluid subject to extraction; and
    the other fluid is the extraction medium.

7. A reaction method for mixing a first reactant and a second reactant using the flow channel structure according to claim 1 or 2, thereby causing both of the reactants to chemically react with each other, wherein:
    the first reactant is caused to flow through the main channel along the top surface of the substrate, the second reactant from each of the sub channels and the merging portion connected to each of the sub channels is merged and mixed in the thickness direction of the substrate with the first reactant flowing through the main channel; and
    both of the reactants chemically react with each other while the mixed fluid of both of the reactants is flowing through the main channel toward a downstream side.

8. The flow channel structure according to claim 1, wherein the wall surface extends in the thickness direction of the substrate.

* * * * *